United States Patent

[11] 3,634,015

[72] Inventors Jarvis K. Lauderback;
 George F. Converse, both of Kingsport, Tenn.
[21] Appl. No. 45,539
[22] Filed June 11, 1970
[45] Patented Jan. 11, 1972
[73] Assignee Eastman Kodak Company
 Rochester, N.Y.

[54] DISPERSION OF AZOBENZENE COMPOUNDS AND AMMONIUM HYDROXY-NAPTHOIC ACID SALTS IN AN AQUEOUS DYE COMPOSITION
 4 Claims, No Drawings

[52] U.S. Cl. .................................................. 8/46, 8/44
[51] Int. Cl. ...................................................... D06p 3/68

[50] Field of Search ............................................. 8/46, 45, 44

[56] References Cited
 UNITED STATES PATENTS
 913,633  2/1909  Fourneaux ................... 8/45
 OTHER REFERENCES
 Rath et al., Melliand, 35, March, 1954, p. 267– 269.

Primary Examiner—George F. Lesmes
Assistant Examiner—Patricia C. Ives
Attorneys—J. Frederick Thomsen and Cecil D. Quillen, Jr.

ABSTRACT: An aqueous dye composition useful for dyeing cellulose acetate textile materials black contains a 4-amino-4'-[di-($\beta$-hydroxyethyl)amino]azobenzene compound and a salt of 2-hydroxy-3-naphthoic acid and mono- or di-ethanolamine.

DISPERSION OF AZOBENZENE COMPOUNDS AND AMMONIUM HYDROXY-NAPTHOIC ACID SALTS IN AN AQUEOUS DYE COMPOSITION

This invention concerns a novel dye composition and more particularly an aqueous dye composition containing an aminoazobenzene and an ammonium salt of 2-hydroxy-3-naphthoic acid.

Aqueous dye compositions containing an aminoazobenzene compound, such as 4-amino-4'-[di-(β-hydroxyethyl)amino] azobenzene, and an alkali salt of 2-hydroxy-3-naphthoic acid, such as sodium 2-hydroxy-3-naphthoate, have been used in the production of black dyeings on cellulose acetate textile materials. The azobenzene component is dispersed in the aqueous phase of the composition while the naphthoate component is in solution. In the preparation of such dye compositions, the azobenzene component, as a finely divided aqueous dispersion, is added to a solution of the naphthoate component. Black dyeings on cellulose acetate fibers, yarns and fabrics are produced when the dye composition is applied to such textile materials according to conventional procedures employed for the application of developed dyes.

A serious disadvantage of the above-described dye compositions was the crystallization of the naphthoate component during the storage of the dye composition. The naphthoate crystals would settle to the bottom of the container, entrapping the finely divided azobenzene component resulting in a substantially solid mass which was difficult to disperse and redissolve in the aqueous phase of the dye composition immediately prior to its use. Frequently the composition containing such a mass could be used only if the composition was processed again in an appropriate mill. Crystallization of the naphthoate component also decreased the penetration of that component into the cellulose acetate material to be dyed. The use of more water in the composition was not a practical solution to the problem presented by the prior art dye compositions. Additional water not only would increase shipping costs but would limit the usefulness of the dye composition which generally is used to dye cellulose acetate in a low textile material to dye bath ratio.

We have discovered that the crystallization problem can be avoided by the substitution in the dye composition of an ammonium salt of 2-hydroxy-3-naphthoic acid for alkali salt of 2-hydroxy-3-naphthoic acid. Our novel dye composition is completely stable in that an undesirable mass, characteristic of the prior art compositions, does not form, even upon prolonged storage. The ammonium 2-hydroxy-3-naphthoic acid salt does not adversely affect either the dyeing properties or the fastness properties of the dye composition.

Our novel dye composition comprises a dispersion of about 10 to about 20 weight percent of an azobenzene compound having the formula

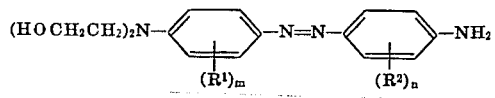

about 14 to about 24 weight percent of an ammonium compound, in solution, having the formula

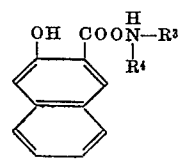

and water. In the above formulas $R^1$ and $R^2$, which can be the same or different, each is lower alkyl such as methyl and ethyl; lower alkoxy such as methoxy, ethoxy or butoxy; or halogen such as a chlorine or bromine atom; $m$ and $n$, which also can be the same or different, each is 0, 1 or 2; $R^3$ is hydrogen or lower hydroxyalkyl such as 2-hydroxyethyl and 2-hydrox- ypropyl; and $R^4$ is lower hydroxyalkyl. As used herein to describe an alkyl or alkoxy group, lower designates a carbon content of from one to about four carbon atoms. The novel dye composition also can contain minor amounts, e.g., up to about 5 weight percent of dispersing agents and/or surfactants. Preferably, the composition contains about 12 to about 16 weight percent of the azobenzene component and about 16 to about 22 weight percent of the ammonium compound. Since the groups represented by $R^1$ and $R^2$ have no significant effect on the dyeings produced by the dye composition, $m$ and $n$ are, for economic reasons, preferably 0.

Our novel dye compositions can be prepared by a variety of methods. For example, an ethanolamine having the formula

and 2-hydroxy-3-naphthoic acid can be dissolved in water, thus forming a solution of the ammonium-naphthoic acid salt to which can be added a dispersion of the azobenzene component which also may contain a dispersing agent and/or surfactant such as a sodium lignosulfonate or a sodium N-methyl-N-oleoyltaurate composition. The azobenzene compounds are known compounds and/or can be prepared according to published procedures. Examples of such compounds include 4-amino-4'-[di-(β-hydroxyethyl)amino]azobenzene, 4-amino-2,5-dimethoxy-4'-[di-(β-hydroxyethyl)amino]azobenzene, and 4-amino-2-methyl-2'-chloro-4'-[di-(β-hydroxyethyl)amino]azobenzene. The dispersion of the azobenzene component is prepared by conventional milling techniques, for example, by ball milling. Preferably, the azobenzene component is milled until at least 90 percent by weight of the azobenzene compound has been reduced to a particle size of 2 microns or less.

The preparation of one novel composition is further illustrated by the following examples.

EXAMPLE 1

A mixture of 103.2 g. monoethanolamine, 318.0 g. 2-hydroxynaphthoic acid and 467.8 g. water are stirred at room temperature until complete solution is effected. To this solution is added a dispersion of about 297.2 g. of 4-amino-4'-[di-(β-hydroxyethyl)amino]azobenzene in approximately 740.0 g. of water which also contains about 74.3 g. of a sodium lignosulfonate-dispersing agent. The dye composition is stirred for 30 minutes. After standing for six months, no sludging or gelling occurs. The slight amount of azobenzene component which settles out is easily dispersed by stirring. Comparable results are obtained when 177.7 g. diethanolamine are substituted for the monoethanolamine.

EXAMPLE 2

According to the procedure described in example 1, a dye composition was prepared by mixing a dispersion of approximately 148.6 g. 4-amino-4'-[di-(β-hydroxyethyl)amino]azobenzene and 37.2 g. of a sodium lignosulfonate in 370.0 g. water with a solution of 168.6 g. of 2-hydroxy-3-naphthoic acid monoethanolamine salt in 275.9 g. water. After standing for three months, no sludge, difficult to stir, forms in the composition.

Dye compositions identical, except for the substitution of an equivalent amount of sodium 2-hydroxy-3-naphthoate for the naphthoic acid-amine salts employed in examples 1 and 2, to those described in the preceding examples are not stable. A hard sludge forms at the bottom of the compositions containing sodium 2-hydroxy-3-naphthoate. The sludge, consisting of needle-shaped crystals of sodium 2-hydroxy-3-naphthoate and the azobenzene component particles, is extremely difficult to stir and in some cases it is difficult to penetrate the sludge with a stirring rod.

The novel dye compositions can be used to produce black shades on cellulose acetate fibers according to the following procedure: 0.6 g. of the dye composition of example 1 is placed in a beaker and the volume of the bath is then brought to a total volume of 300 ml. with water. The bath is brought to 120° F., a 10 g. sample of a fabric of secondary cellulose acetate fibers (Estron) is placed in the bath which is slowly brought to 180° to 190° F. and the dyeing is continued at that temperature for 1 hour. After cooling the dye bath to about 120° F., 10 ml. of 6 percent hydrochloric acid is added. The bath is stirred for 15 minutes and 10 ml. of an 8 percent sodium nitrite solution is added and the stirring is resumed for 20 minutes at 120° F. The dyed fabric is then removed from the bath, after-washed in a solution containing 0.5 percent sodium N-methyl-N-oleoyltaurate and 0.5 percent sodium hydrosulfite, rinsed in water and dried. The black fabric exhibits good fastness to washing.

The invention has been described in considerable detail with particular reference to certain preferred embodiments thereof, but it will be understood that variations and modifications can be effected within the spirit and scope of the invention as described hereinabove.

We claim:

1. An aqueous dye composition comprising
  a. about 10 to about 20 weight percent of the composition of a dispersion of an azobenzene compound having the formula

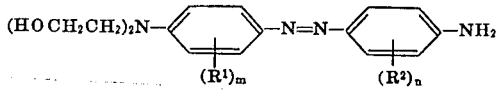

wherein $R^1$ and $R^2$ each is lower alkyl, lower alkoxy or halogen and $m$ and $n$ each is 0, 1 or 2; and
  b. about 14 to about 24 weight percent of the composition of an ammonium compound having the formula

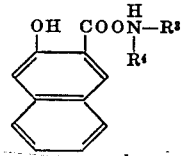

in solution wherein $R^3$ is hydrogen or lower hydroxyalkyl and $R^4$ is hydroxyalkyl.

2. A dye composition according to claim 1 wherein the concentration of the azobenzene component is about 12 to about 16 weight percent and the concentration of the ammonium component is about 16 to about 22 weight percent.

3. A dye composition according to claim 2 wherein $m$ and $n$ each is 0, $R^3$ is hydrogen or hydroxyethyl, and $R^4$ is hydroxyethyl.

4. A dye composition according to claim 2 wherein $m$ and $n$ each is 0, $R^3$ is hydrogen, and $R^4$ is hydroxyethyl.

* * * * *